(12) United States Patent
Bogan

(10) Patent No.: US 12,426,582 B2
(45) Date of Patent: Sep. 30, 2025

(54) FISHING LURE

(71) Applicant: Nathaniel Bogan, Natick, MA (US)

(72) Inventor: Nathaniel Bogan, Natick, MA (US)

( * ) Notice: Subject to any disclaimer, the term of this patent is extended or adjusted under 35 U.S.C. 154(b) by 0 days.

(21) Appl. No.: 18/015,253

(22) PCT Filed: Jul. 8, 2021

(86) PCT No.: PCT/US2021/070845
§ 371 (c)(1),
(2) Date: Jan. 9, 2023

(87) PCT Pub. No.: WO2022/011389
PCT Pub. Date: Jan. 13, 2022

(65) Prior Publication Data
US 2023/0263144 A1     Aug. 24, 2023

Related U.S. Application Data

(60) Provisional application No. 63/157,955, filed on Mar. 8, 2021, provisional application No. 62/705,619, filed on Jul. 8, 2020.

(51) Int. Cl.
*A01K 85/00* (2006.01)
*A01K 85/16* (2006.01)

(52) U.S. Cl.
CPC ............ *A01K 85/028* (2022.02); *A01K 85/16* (2013.01); *A01K 85/1803* (2022.02); *A01K 85/1837* (2022.02); *A01K 85/1851* (2022.02); *A01K 85/1863* (2022.02)

(58) Field of Classification Search
CPC .... A01K 85/02; A01K 85/028; A01K 85/022; A01K 85/023; A01K 85/024; A01K 85/025; A01K 85/027; A01K 85/1851; A01K 85/16
See application file for complete search history.

(56) References Cited

U.S. PATENT DOCUMENTS

| | | | | | |
|---|---|---|---|---|---|
| 627,344 | A | * | 6/1899 | Maroney | A01K 85/02 43/42.46 |
| 1,021,699 | A | * | 3/1912 | Nordlund | A01K 85/02 43/37 |
| 1,537,266 | A | * | 5/1925 | Ryan | A01K 85/16 43/42.41 |
| 2,613,469 | A | * | 10/1952 | Haberkorn | A01K 85/02 43/35 |
| 2,667,006 | A | * | 1/1954 | Lehmann, Sr. | A01K 85/02 43/35 |

(Continued)

*Primary Examiner* — Richard G Davis
(74) *Attorney, Agent, or Firm* — Casimir Jones, S.C.; Ellen M. Gonzales

(57) ABSTRACT

The disclosure provides various components for a fishing lure. These components include a Hard Bodied Ballast Oscillator ("HBBO") which oscillates around various axes, an HBB with positive lift that rises during retrieval, and a hook for use in a rigid body which, while being fished, remains at least partially inside the body and reliably pointing upwards, and which, when the fish bites, is at least partially exposed. In some cases multiple components may be connected to each other via a stiff wire and designed to maintain, in the water, a particular orientation of the components relative to each other.

8 Claims, 22 Drawing Sheets

(56) References Cited

U.S. PATENT DOCUMENTS

| | | | | |
|---|---|---|---|---|
| 2,871,608 | A * | 2/1959 | Fisher | A01K 85/02 43/35 |
| 2,994,982 | A * | 8/1961 | Murawski | A01K 85/02 43/42.35 |
| 3,411,233 | A * | 11/1968 | Hopper | A01K 85/02 43/37 |
| 3,908,298 | A * | 9/1975 | Strader | A01K 85/02 43/42.31 |
| 4,827,656 | A * | 5/1989 | Ohnishi | A01K 85/02 43/34 |
| 5,090,151 | A * | 2/1992 | Salminen | A01K 85/00 43/42.36 |
| 5,207,016 | A * | 5/1993 | Pate | A01K 85/00 43/42.35 |
| 5,218,778 | A * | 6/1993 | Szantor | A01K 85/02 43/42.52 |
| 5,367,818 | A * | 11/1994 | Aduana | A01K 85/02 43/42.44 |
| 5,890,314 | A * | 4/1999 | Peters | A01K 85/02 43/37 |
| 6,105,303 | A * | 8/2000 | Hall, Sr. | A01K 85/02 43/43.11 |
| 6,675,526 | B1 * | 1/2004 | Baron | A01K 85/16 43/42.36 |
| 7,240,454 | B2 * | 7/2007 | Guigo | A01K 91/04 43/44.9 |
| 7,437,849 | B2 * | 10/2008 | Selvaggio | A01K 91/06 43/42.11 |
| 8,689,479 | B1 * | 4/2014 | Smith | A01K 85/02 43/37 |
| 11,684,052 | B1 * | 6/2023 | Walsh, Jr. | A01K 83/02 43/35 |
| 2003/0051389 | A1 * | 3/2003 | Parrish | A01K 85/02 43/37 |
| 2003/0177687 | A1 * | 9/2003 | Parrish | A01K 85/02 43/37 |
| 2007/0107295 | A1 * | 5/2007 | Kaptis | A01K 85/16 43/42.22 |
| 2010/0180488 | A1 * | 7/2010 | Keeton | A01K 85/00 43/42.31 |
| 2011/0107653 | A1 * | 5/2011 | Tsai | A01K 85/16 43/35 |
| 2014/0013648 | A1 * | 1/2014 | Yong-Set | A01K 85/02 43/42.41 |
| 2014/0259870 | A1 * | 9/2014 | Odem | A01K 85/02 43/42.41 |
| 2016/0360737 | A1 * | 12/2016 | Yates | A01K 85/18 |

* cited by examiner

FISHING LURE

CROSS-REFERENCE TO RELATED APPLICATIONS

The following application claims benefit of U.S. Provisional Application No. 62/705,619 filed Jul. 8, 2020, and U.S. Provisional Application No. 63/157,955 filed Mar. 8, 2021, both of which are hereby incorporated by reference in their entirety.

BACKGROUND

Fishing lures are one of the world's oldest technologies. At its most basic, a fishing lure (or bait) comprises a hook that snags the fish once the lure has been bitten. Of course, not all fish will bite on a plain hook and thus lures frequently include additional components with the goal of attracting or encouraging the fish to bite the lure. Additional components may hide or disguise the hook to include or resemble something the fish would naturally bite on (i.e., a worm, small fish, insect, roe, etc.) Alternatively or additionally, such components may be designed to make the lure move or behave in certain way (weights to make the lure sink, spinners to make the lure or part of the lure spin or rotate, etc.). It will be understood, or course, that any particular lure may comprise multiple components, for example hooks, spinners, weights, etc., and that some components may serve multiple functions.

In general, anglers tend to select the lures that they feel work best for them, their fishing style, the fish they are attempting to catch, and the environment in which they will be fishing. When taking the type of fish that the angler is attempting to catch into account, anglers will typically consider the size of the fish, the size of the fish's mouth, what the fish is typically attracted to, and the environment the fish typically inhabits during the time of day the angler expects to fish. Accordingly, it is not unusual for lures to be designed for specific types of fish in specific areas. For example, specific lures may be designed to catch largemouth bass typically found on the East coast of the United States. For example, lures commonly labeled as "bass fishing lures" include the (in-line) spinner, the spinnerbait, and the crankbait. Each of these lures has known advantages and disadvantages. Of course, it will be understood that while some lures may be suitable only for a particular type of fish, other lures which may be considered to be specialized or marketed for a specific type of fish and/or location may be entirely capable and even equally or more capable of catching other types of fish in other types of locations.

An example of an in-line spinner is shown in FIG. 1. When drawn through the water, the "blade" 11 of the spinner rotates around the axis 12 that is the rest of the lure. This is shown with arrow 13. This creates a roughly conic-shaped disturbance in the water that fish can easily sense with their lateral lines.

An example of a spinnerbait is shown in FIGS. 2A and 2B. Bass like to be very close to logs and rocks, but in-line spinners tend to snag on virtually everything they hit, because the action of the retrieve drives the hook (or hooks) into the obstacle. The spinnerbait includes a spinner 20 connected via a swivel 21 to a rigid bent wire 22 at a first end. It should be noted that the presence of the swivel is necessary so that the spinner can freely spin around the point of connection. The second end of the rigid bent wire is connected to a hook component 23 that comprises a hook 24 and a skirt 25. The "open-safety-pin" layout of the wire 21 allows for the concept of a spinner, in that it rotates about the axis to create the roughly conic-shaped disturbance in the water, but, importantly, in a configuration that puts the hook 24 reliably on the "inside." so that the bait almost never snags the obstacle. In use, bass tend to bite the skirted part 23 of the bait as opposed to the spinner 20. The spinnerbait in FIG. 2B further includes a second blade 26 attached directly to wire 21.

An example of the crankbait is shown in FIG. 3. While the body 31 of the crankbait is generally shaped like a fish, it also includes a lip 30 which is angled to cause the lure to dive during retrieval and that also causes the body to move through the water with a left-right wiggle that capitalizes on the fish's ability to sense and localize sources of vibration.

Of course, once the fish is "hooked" it can be difficult to separate the fish from the lure—often leading to the angler catching themselves! Moreover, an exposed hook can easily snag on vegetation or other objects. Accordingly, some lures are designed such that the hook is at least partially hidden within the body and/or remains in an upright orientation to help avoid snags.

An example of a lure with a partially hidden hook is the lure commonly referred to as the "Texas-rigged plastic worm" (or "Texas rig") shown in FIG. 4.

Importantly, the Texas rig includes a soft plastic bait 41 with a texture like soft rubber or similar to "gummy worm" candy. When rigged, the hook 42 is pushed into the worm, but the point and/or barb remains inside the worm (arrow 43). When a fish bites it, that action pushes the worm down, exposing the point and barb and sending it into the fish's mouth. The hooked fish may also pull the entire hook through the worm, leaving the worm up the line.

The Texas rig has numerous desirable properties, including for example:
  a. It is relatively unlikely to snag, because the point is not exposed, or not exposed much. (That said, the worm itself will tend to "grab" interesting obstacles and push the hook through, and then the point is fully exposed for the next obstacle and it snags.)
  b. It is remarkably consistent in hooking the fish, because bass (and most other game fish) typically bite at the "head" of their target—i.e., directly chomp the hook.
  c. It is especially good at retaining a fish once hooked. The single hook assures that all pressure is concentrated in that one place, and there is very little mass that remains connected to the hook, making it very challenging for the fish to "throw" the hook, even with a jump and head-shake that bass are famous for.

However, the Texas rig also has few undesirable properties, notably:
  a. It is destructive. The plastic worm is nearly always damaged by catching a fish, and it will need to be replaced frequently.
  b. It doesn't maintain orientation. It is just as likely to point down into a potential obstacle as up away from it. The entire rig can spin (though usually very slowly, not like a spinner).
  c. It cannot be used in any bait that is not soft, and that includes all sorts of popular lures.

A second related concept is a hook that is exposed but that remains pointing upward in most cases. Examples of this can be found in lures commonly referred to as the above-described spinnerbait (FIG. 2), the "jig." (FIGS. 5 and 6) and the "swimbait" (FIG. 7). In general, most of these lures achieve the hook orientation by placing the majority of the weight of the lure below the attachment point, thus acting like a ballast to maintain a particular orientation. In these examples, because the hook remains pointed upward, it has a significant degree of snag resistance, as the hook is positioned up and away as the lure slides over the obstacle.

As discussed above, one major class of lures is the crankbait shown in FIG. 3. A common type of crankbait has 6 hooks, arranged in two "treble hooks" 32, as shown. And these hooks not only dangle away from the body 31, but flail around wildly during the retrieve. This offers essentially none of the advantages mentioned above, and—perhaps surprisingly—crankbaits are among the easiest of all baits for a fish to throw, because they don't maintain much pressure per hook, and the flailing-but-directly-attached body moves around relative to the hook. Moreover, the body being attached at a joint to the hook actually helps the fish to dislodge it, because shaking its head around amounts to the fish "trying" a wide variety of force directions (due to the body momentum acting on the hook) that might dislodge the hook. This is even worse than a rigidly attached hook, because it actually helps the fish "search" for the dislodging direction. Furthermore, the only thing that prevents the crankbait from snagging on every single potential obstacle is that the downward angle of the lip 30 causes the lure to dive such that the lip ends up hitting most obstacles before the hooks. Additionally, these hook arrangements are disadvantageous when the angler wishes to dislodge the hook(s), often requiring trial and error to find the correct angle, and having to manage other hook points, some of which may have also snagged the fish. And of course, the multiple hooks design leaves a number of hooks available to stab the angler.

As such, there is a continuous need for novel fishing lure components and designs that make fishing faster and easier, both in terms of the catch and the "release" (regardless of whether the fish will be released to swim again or to a cooking pot).

SUMMARY

According to various embodiments, the present disclosure provides novel fishing lure components that can be used alone or in combination with each other or in combination with previously described lures. The components include a Hard Bodied Ballast Oscillator ("HBBO") which oscillates around various axes, an HBBO with positive lift that rises during retrieval, and a hook for use in a rigid body which, while being fished, remains at least partially inside the body and reliably pointing upwards, and which, when the fish bites, is at least partially exposed. According to further embodiments the present disclosure provides a Vertically Oriented Hard Bodied Ballast Oscillator (VOHBBO) wherein an HBBO is connected via a connector to a spatially distanced hook, wherein the connector maintains the distance between the HBBO and the hook and, wherein when the lure is in water, the HBBO is maintained in a relatively upright position such that the HBBO is positioned above the hook.

DETAILED DESCRIPTION

According to various embodiments, the present disclosure provides various fishing lure components that may be used separately or in combination, resulting in a variety of novel configurations.

According to a first embodiment, the present disclosure provides an oscillating component for use in or as a fishing lure. As explained in greater detail below, the oscillating component of the present disclosure (referred to herein as the Hard Bodied Ballast Oscillator ("HBBO")) is designed to oscillate around various axes rather spin.

Figure 8A:
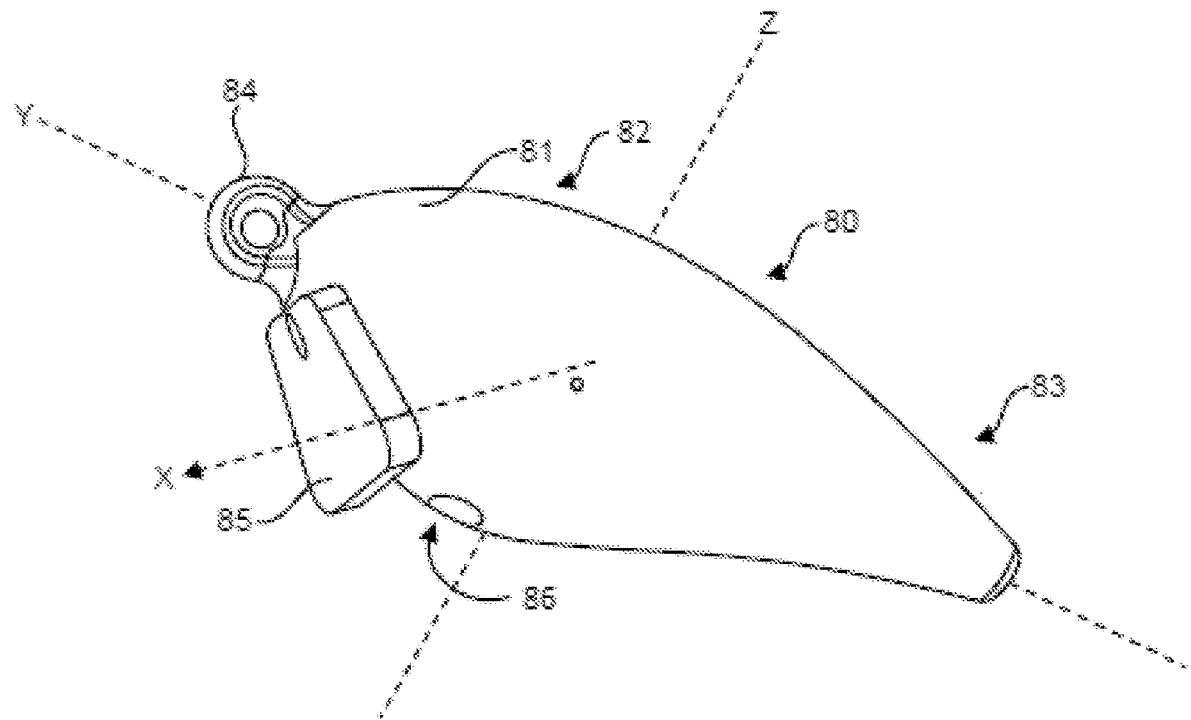
FIG. 8A depicts a Hard Bodied Ballast Oscillator "HBBO" according to an embodiment of the present disclosure.

FIG. 8A is a side view of an exemplary HBBO 80 according to an embodiment of the present disclosure, showing the x, y, and z axes of the oscillator. In FIG. 8A, the y-axis points towards the direction of retrieval, z points towards the sky (when the oscillator is in the water) and x extends from the left and right sides of the oscillator. In general, the HBBO includes a rigid, or mostly rigid, body 81. In the depicted embodiment the body includes a larger bulbous portion 82 at its proximal end and a tapered portion 83 at its distal end (vaguely resembling a fish). Of course, other body shapes could be used including, for example, a spoon shape. In the depicted embodiment, the oscillator includes an attachment mechanism 84 at its proximal-most end. In the depicted embodiment, the attachment mechanism is an O-ring or eye extending from the proximal end of the oscillator body. While the depicted embodiment shows the attachment mechanism oriented vertically (relative to the oscillator body) it will be understood that other orientations, including vertical, angled, or tilted orientations are also contemplated.

Figure 1:
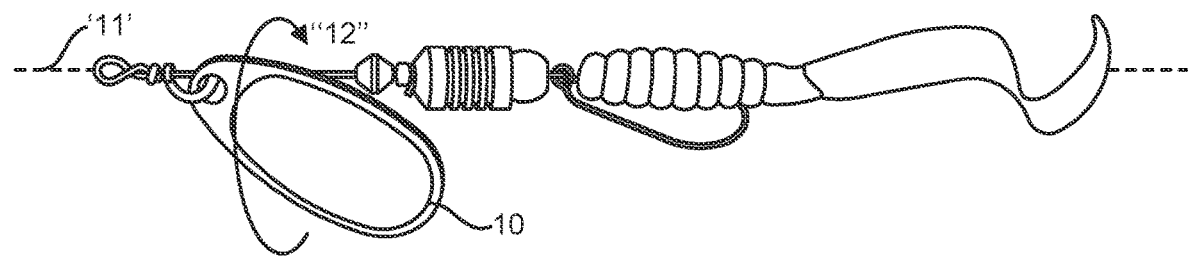
FIG. 1 is an example of a prior-art lure commonly referred to as an "in-line spinner."
Figure 2A:
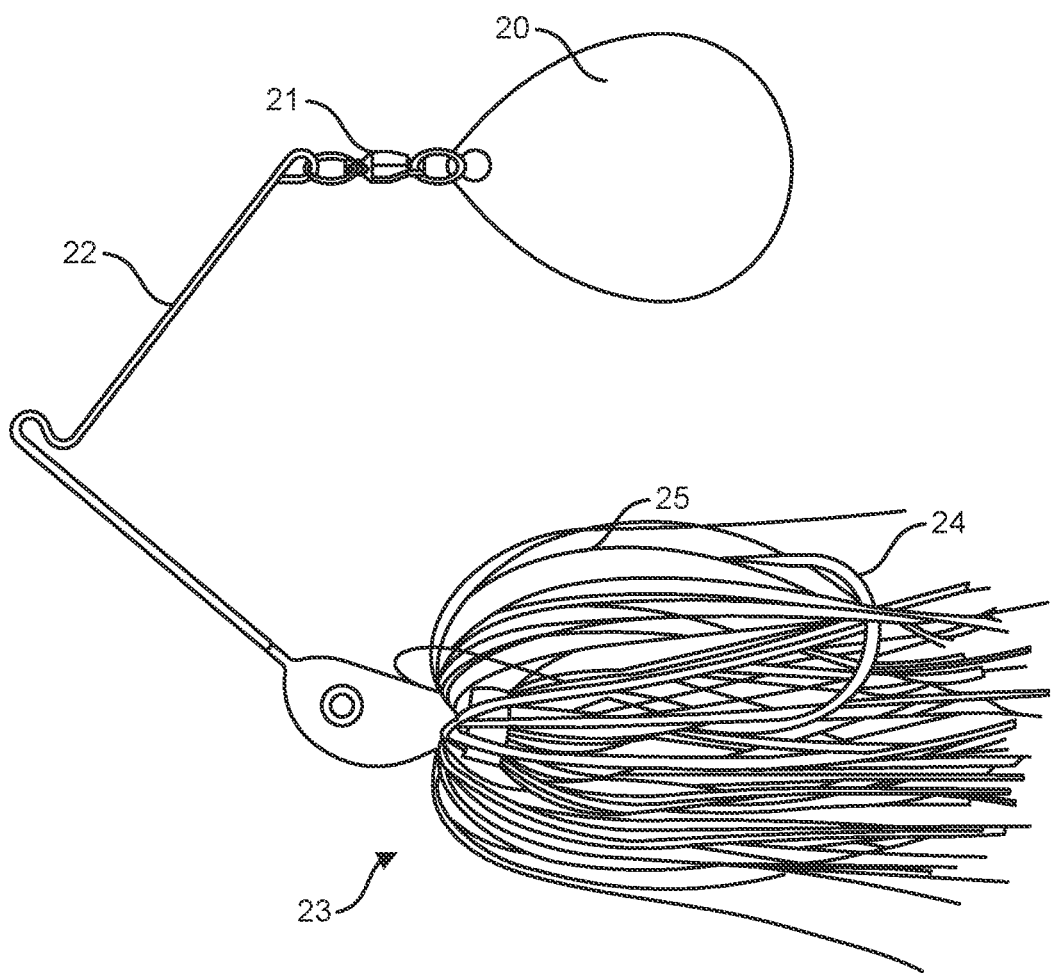
FIG. 2A is an example of a prior art lure commonly referred to as a "spinnerbait."
Figure 2B:
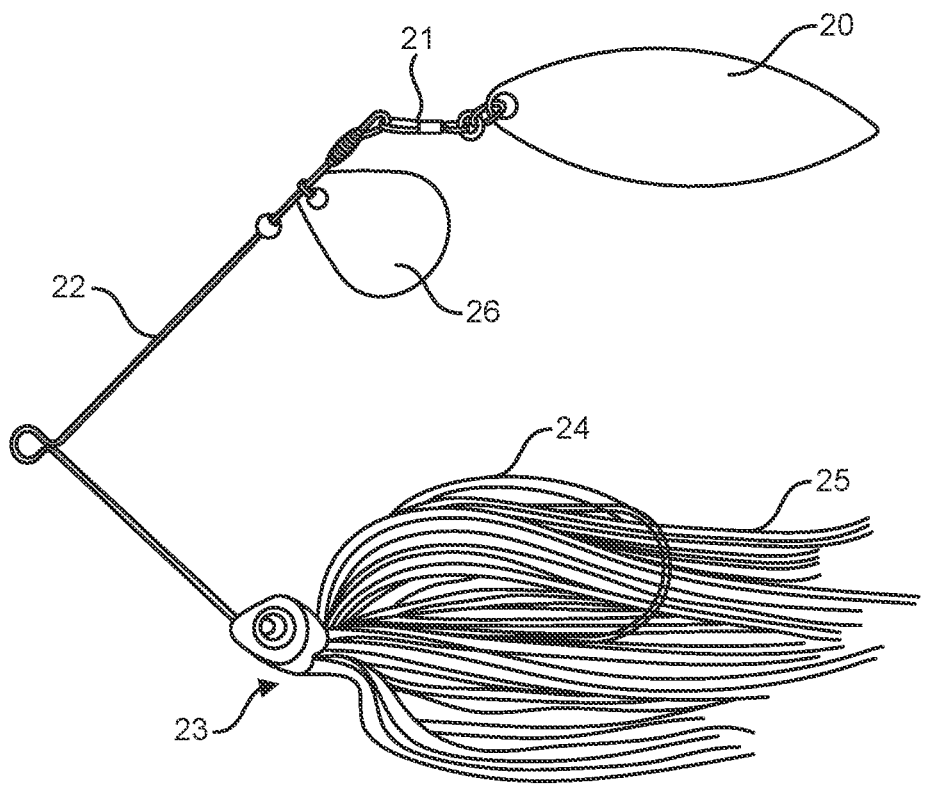
FIG. 2B is another example of a prior art lure commonly referred to as a "spinnerbait."
Figure 3:
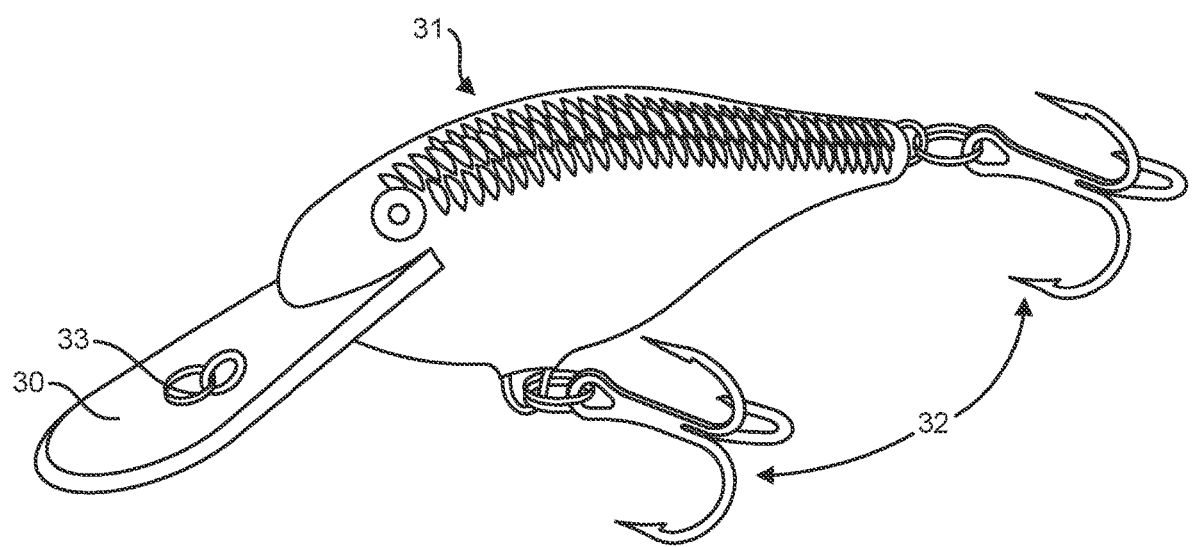
FIG. 3 is an example of a prior art lure commonly referred to as a "crankbait."
Figure 4:
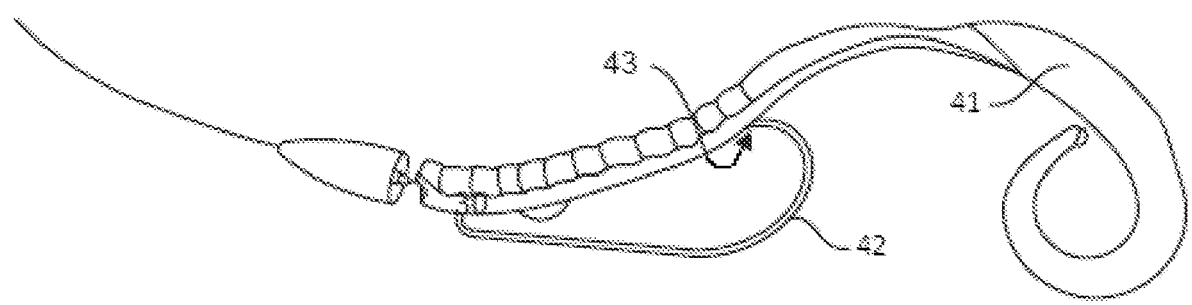
FIG. 4 is an example of a prior art lure commonly referred to as a "Texas-rigged plastic worm" or "Texas rig."
Figure 5:
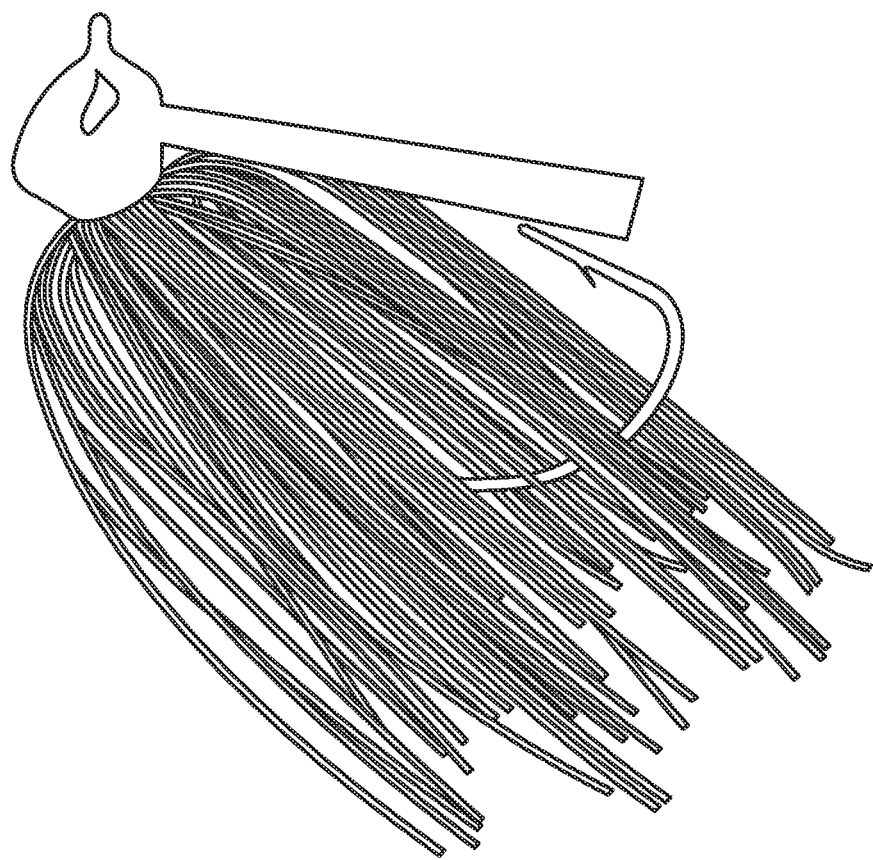
FIG. 5 is an example of a prior art lure commonly referred to as a "jig."
Figure 6:
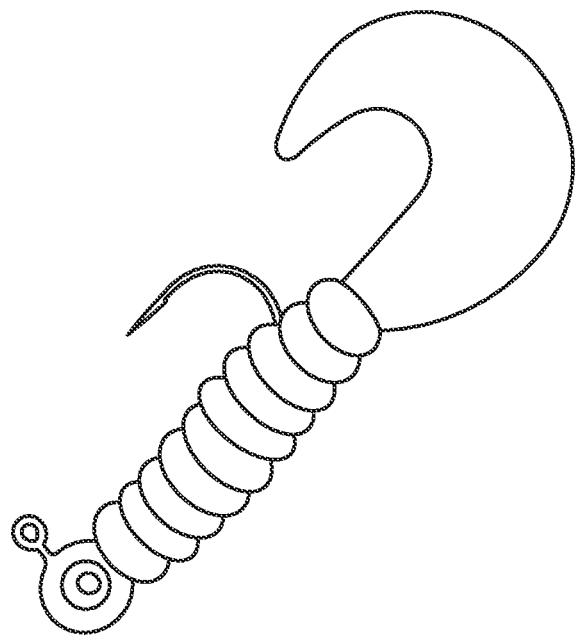
FIG. 6 is another example of a prior art lure commonly referred to as a "jig."
Figure 7:
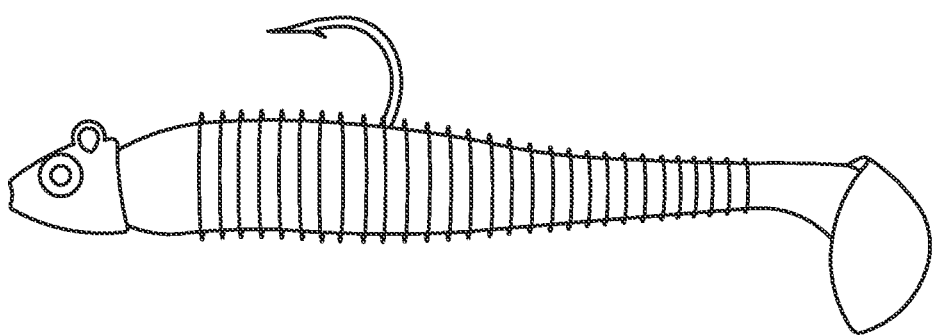
FIG. 7 is an example of a prior art lure commonly referred to as a "swimbait."
Figure 8B:
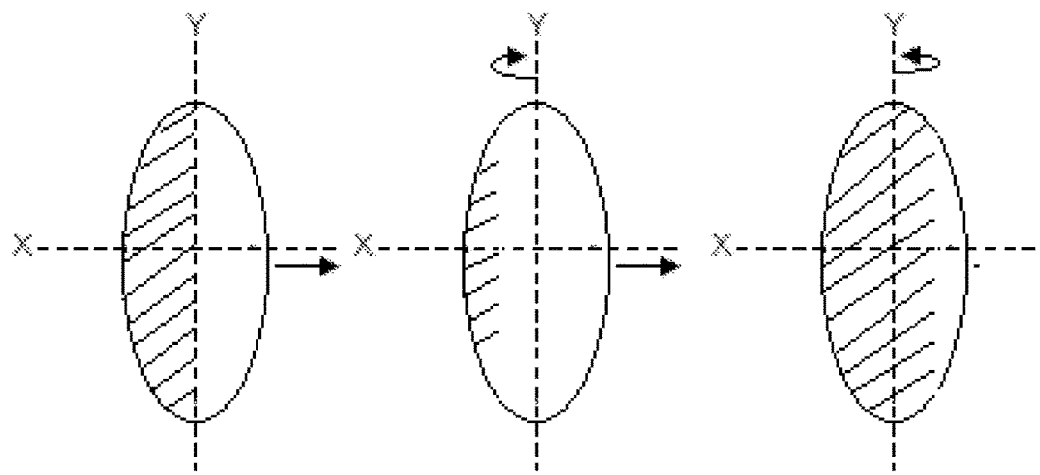
FIG. 8B is a top view of the HBBO during "roll" oscillation.
Figure 8C:
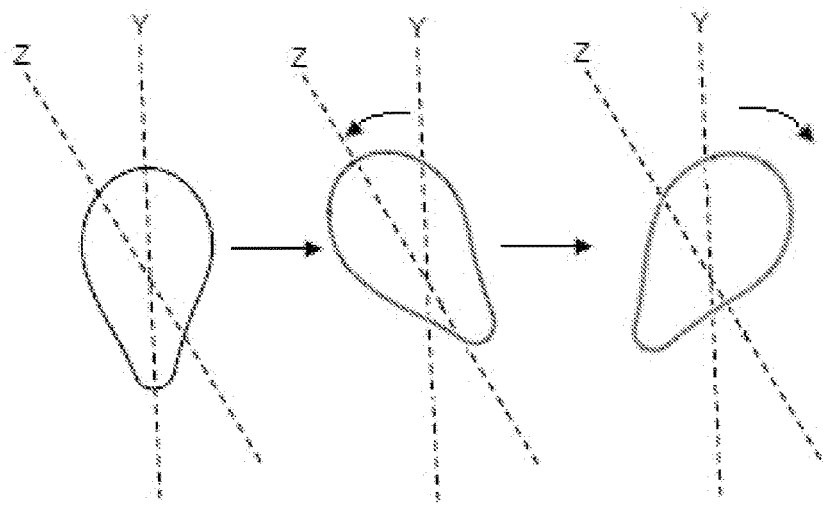
FIG. 8C is a top view of the HBBO during "slalom" or "yaw" oscillation.
Figure 8D:
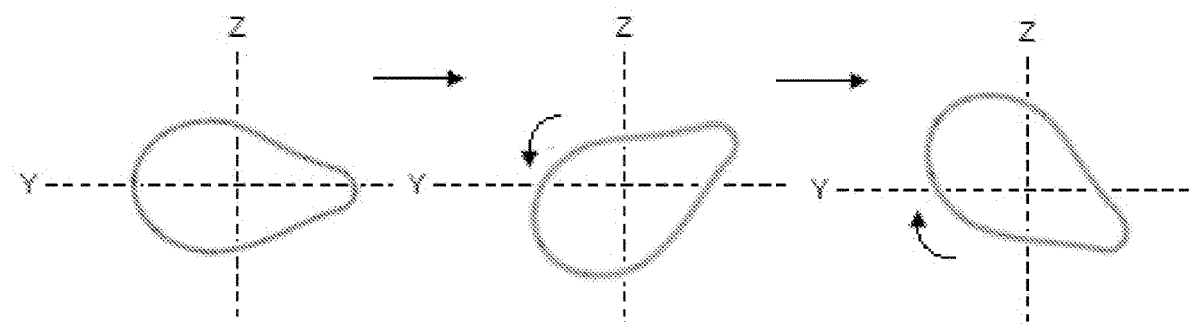
FIG. 8D is a side view of the HBBO during "vertical" or "leech" oscillation.
Figure 9:
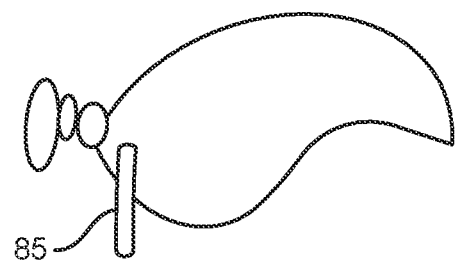
FIG. 9 is a side view of an HBBO with a lip configured to provide neutral lift.
Figure 10:
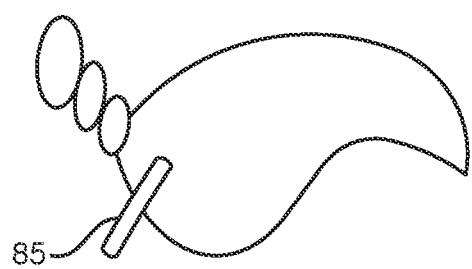
FIG. 10 is a side view of an HBBO with a lip configured to provide negative lift.

As shown in the depicted embodiment. HBBO 80 may further include a lip 85, which is positioned at the proximal end or "head" of the oscillator body below the attachment mechanism. Referring briefly to FIG. 3, it can be seen that prior art lures such as the crankbait include a lip 30 which extends forward from the "mouth" of the body 31. Moreover, the forward-facing crankbait lip causes and is designed to cause the lure to dive during retrieval. In contrast, the upward facing lip 85 shown in FIG. 8 provides lift to the oscillator. Changing the angle of the lip relative to the oscillator body alters the type of lift provided to the oscillator. For example, in the embodiment shown in FIG. 8, the lip is swept backwards, creating positive lift, causing the lure to climb the water column when retrieved. Alternatively, as shown in FIG. 9, the lip may be directed at an approximately 90° angle relative to the midline of the oscillator body so as to produce neutral lift during retrieval. As a further alternative, as shown in FIG. 10, the lip may be swept forward, creating negative lift.

According to some embodiments, the density of the HBBO may be altered to produce specific behavior. For example, if the density of the HBBO is naturally higher than that of water, the HBBO will sink, if the density is lower than water, it will float, if the density is the same as water, the HBBO will have neutral buoyancy. According to some embodiments, the HBBO may include a ballast chamber (seen better, for example, in FIG. 12 at 125) which is able to receive various ballast altering inserts via access hole 86 (FIG. 8). For example, one insert might be weighted to increase the overall density of the HBBO while another insert might be hollow in order to decrease the overall density of the HBBO. According to an embodiment, the ballast insert may be threaded so that it can be screwed into the ballast chamber, though other securing mechanisms will be readily apparent.

The present disclosure further contemplates an HBBO that uses both the density of the body and the angle of the lip to produce a desired behavior in the water. For example, a specific embodiment may utilize a body with density higher than water so that absent any other forces, it will sink in the water, and an upward facing lip (to create positive lift) so that it rises as it is being retrieved. Moreover, as explained in greater detail below, the HBBO may include a density gradient (for example, lower density at the top and higher density at the bottom).

In general, oscillation occurs when a deflection force that pushes an object in one direction away from a base orientation and a stabilizer force that pushes the object in the opposite direction back towards the base orientation are in constant imbalance. In general, as the deflector force pushes the object more and more away from the base position, the stabilizer force becomes increasingly dominant and eventually pushes the object back towards the base orientation, at which point the deflector force begins to dominate, pushing the object away from the base orientation. The HBBO may incorporate one or more modes of oscillation including, but not limited to:

a. "Roll" oscillation—in this oscillation mode, the HBBO oscillates around the y-axis. FIG. 8B is an overhead view with z pointing directly out of the paper and shows the motion of oscillation around the y-axis. In fishing lures, due to the movement of the lure in the water, roll deflection occurs naturally and thus a lure will typically spin in one direction or another absent the presence of a stabilizer. According to an embodiment, the roll oscillation mode is achieved by the presence of a density gradient in the body. Specifically, the HBBO has a higher density on the bottom and a lower density on the top. This density gradient acts as a stabilizer force against the natural tendency for the lure to spin in water. This stabilizer force causes the HBBO to oscillate back and forth around the y-axis.

b. "Slalom" or "yaw" oscillation—in this oscillation mode, the HBBO oscillates around the z-axis. As shown in FIG. 8, z points towards the sky during retrieval. FIG. 8C shows the motion of oscillation around the z-axis. FIG. 8C is an overhead view such that z is pointing directly out of the paper. According to an embodiment, the deflection force is created by a lip (such as lip 85 in FIG. 8A) which faces the tow direction as the lure is dragged through the water. Any force applied to the lip that is slightly off of the pull direction will push the lip (and the body to which it is attached) further into the deflection position. The stabilizer for the slalom oscillation is the body of the HBBO. In general, as yaw increases, more and more of the lure's body is exposed to the flow of the water, countering the force created by the lip and pushing the body back towards base orientation.

c. "Vertical" or "leech" oscillation—in this oscillation mode, the HBBO oscillates (or pivots) around the x-axis. FIG. 8C shows the motion of oscillation around the x-axis (which in the drawing points directly into and out of the paper). According to an embodiment, the vertical oscillation mode is achieved in a manner similar to "yaw" orientation, where the lip and body provide the deflection and stabilizers around the x-axis.

Figure 11:
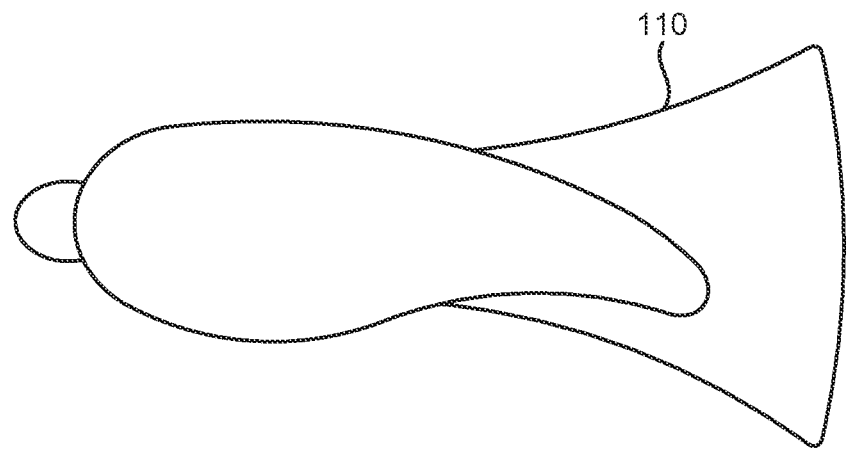
FIG. 11 depicts an HBBO with a rigid body and an optional flexible tail.

Importantly, the HBBO includes an entirely or mostly rigid body and thus does not rely on deformation of the body itself to produce the oscillation. However, as shown in FIG. 11, the HBBO may further include a non-rigid attachment such as a soft plastic, or other material, tail 110. Alternatively, the HBBO may comprise a plurality of rigid segments which are connected to each other. The presence of the segments enables the body, as a whole to move in a unique way, without incorporating a soft or non-rigid body that deforms to produce oscillation.

Figure 12:
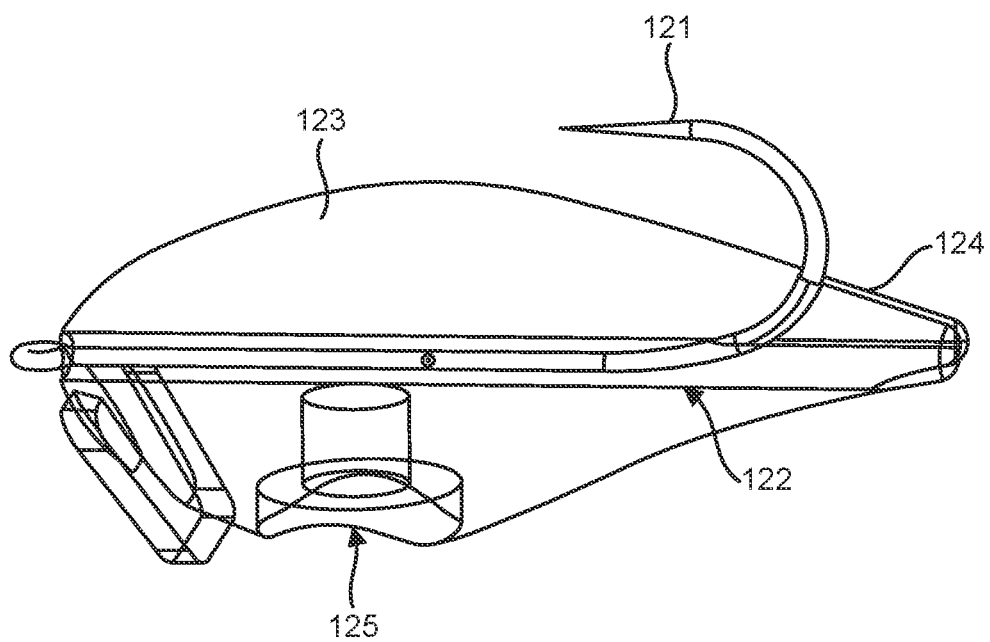
FIG. 12 is a cross-sectional view of a lure body incorporating an exit hook design according to an embodiment of the present disclosure.
Figure 13:
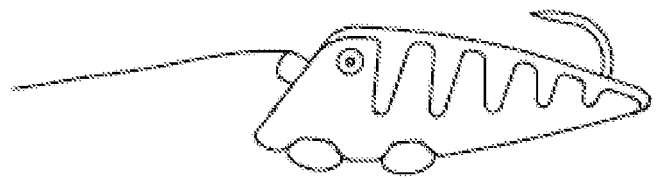
FIG. 13 depicts a lure body with an exit hook design wherein the hook is positioned as it would be while being fished (before a fish is ensnared.)
Figure 14:
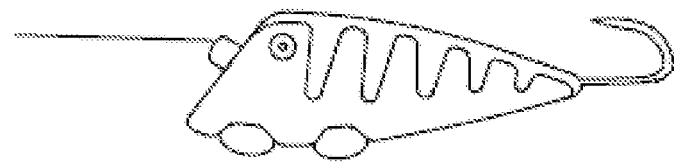
FIG. 14 depicts a lure body with an exit hook design wherein the hook has partially exited body.
Figure 15:
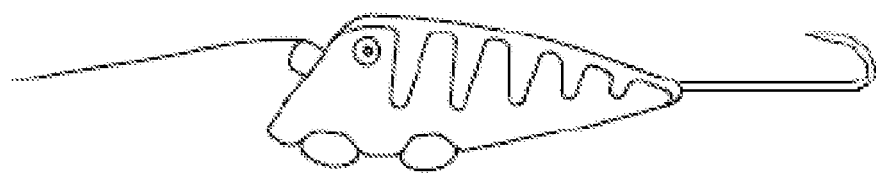
FIG. 15 depicts a lure body with an exit hook design wherein the hook has mostly exited the body.
Figure 16:
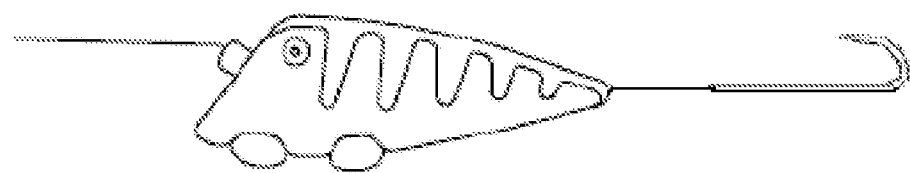
FIG. 16 depicts a lure body with an exit hook design wherein the hook has entirely exited the body and the body has been pushed upwards on the fishing line.

According to another embodiment, the present disclosure provides a hook component (referred to herein as an "exit hook") that can be used in a rigid body and which, while being fished, remains at least partially inside the body and reliably pointing upwards, and which, when the fish bites, is at least partially exposed. An exemplary exit hook design is shown in FIG. 12. As seen in the depicted embodiment, the exit hook rigs a hook 121 inside of a specialized channel 122 inside a rigid body 123. In the depicted embodiment, the channel 122 accommodates or "hides" the straight end of the hook while a portion of the curved or bent end of the hook is exposed.

Figure 29A:
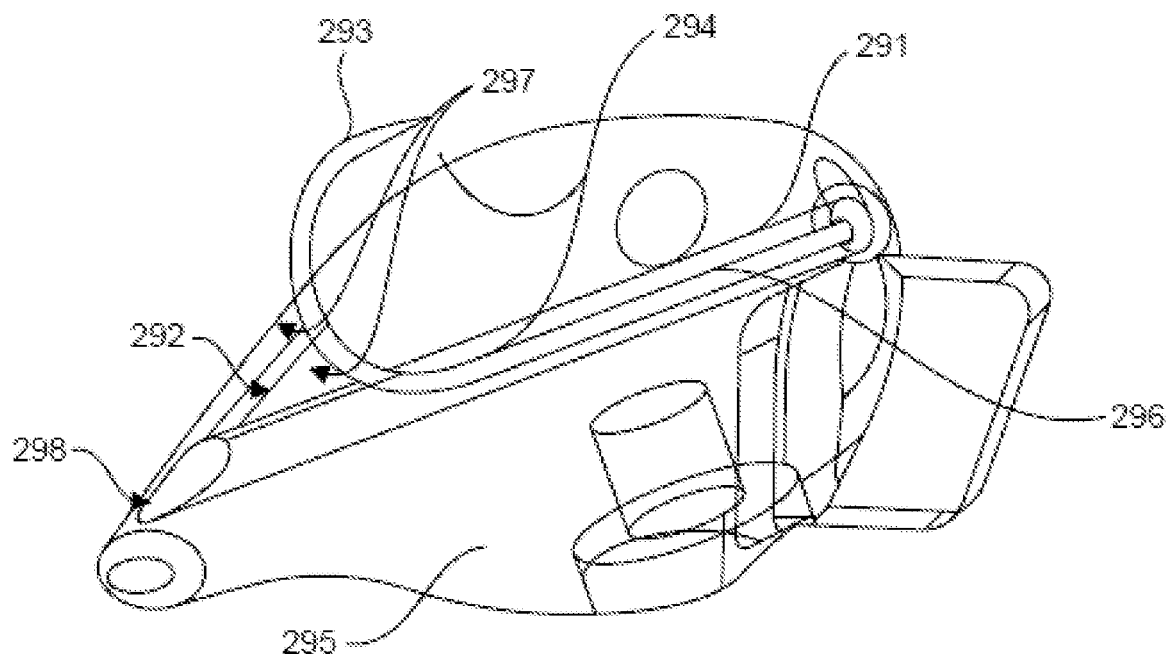
FIG. 29A shows an embodiment of the presently described fishing lure with an exit hook design.
Figure 29B:
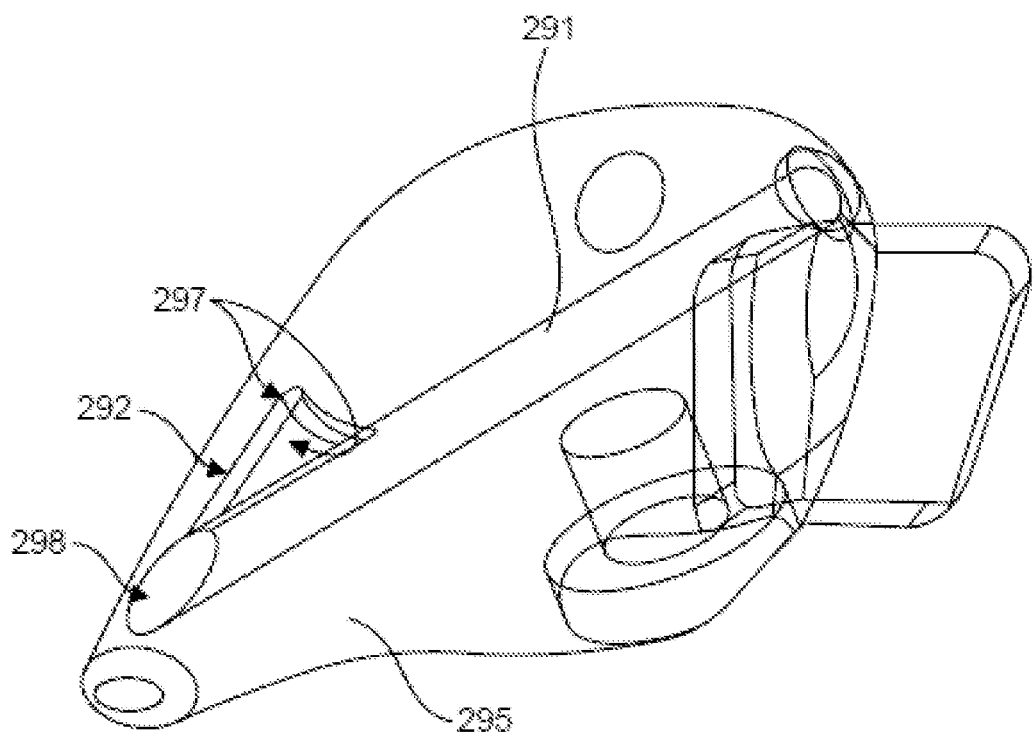
FIG. 29B shows the lure of FIG. 29A with the hook removed.
Figure 29C:
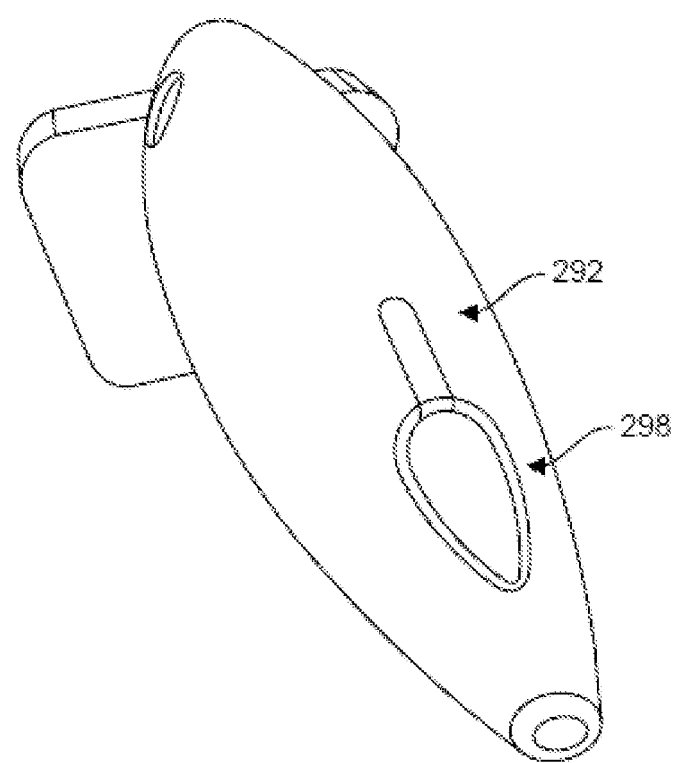
FIG. 29C is a rear view of an exemplary fishing lure with an exit hook design.

As seen in FIGS. 29A-29C, the "upper wall" of distal portion of channel 291 is removed to produce a crook slot 292 which allows the curved "crook" section 293 of the hook 294 to extend out of the body 295 while the straight (shank 296) portion of the hook is seated in the channel. The intact side walls 297 and bottom of the channel act as guides to effectively orient the hook in a desired orientation. It will, of course, be understood that while the figures show the hook extending upwards (i.e., in the z-direction as shown in FIG. 8A), any possible orientation could be used simply by rotating the channel design. As perhaps best seen in FIG. 29C, crook slot 292 terminates in a larger exit 298, which enables the hook to slide out of the body after a fish has been ensnared on the crook.

When the lure is retrieved, the water acts to push the body backward (away from the angler), which is conceptually equivalent to the hook being pushed forward. This causes the crook of the hook to press against the inside of the body, and thus remain in place. But, when a fish bites the body, the fish both pulls the hook away from the angler and squeezes its lips onto the back end of the body, pushing the body forward (towards the angler). Both actions result in the hook sliding out of the body, with the result that the fish is fully engaged with the bend of the hook. The body may then also move up the fishing line, making it far more challenging for the fish to throw the hook (due to lack of mass nearby). FIGS. 13-16 also show how the hook exits the body.

Figure 17A:
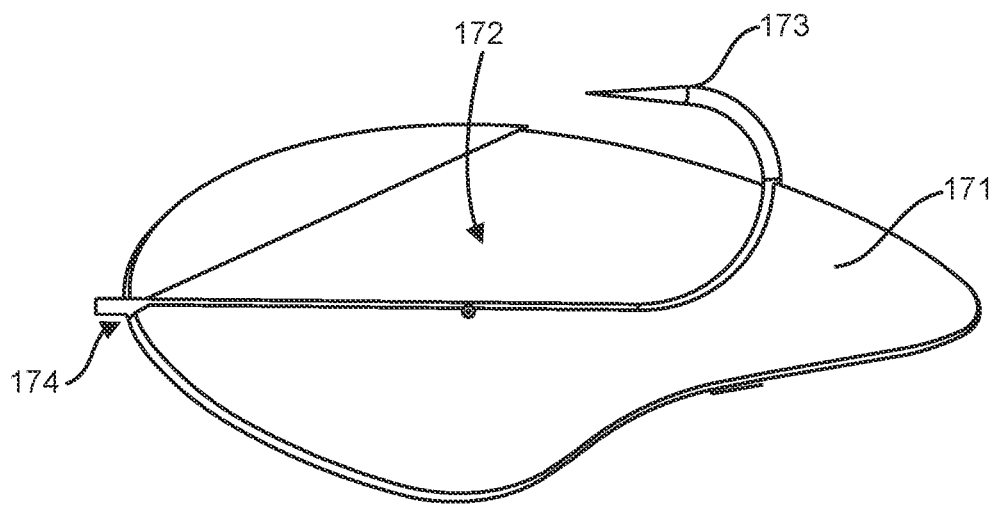
FIG. 17A is a cross-section of a lure body incorporating an embodiment of a pivoting exit hook design wherein the hook is in the mostly hidden position as it would be while being fished (before a fish is ensnared.)
Figure 17B:
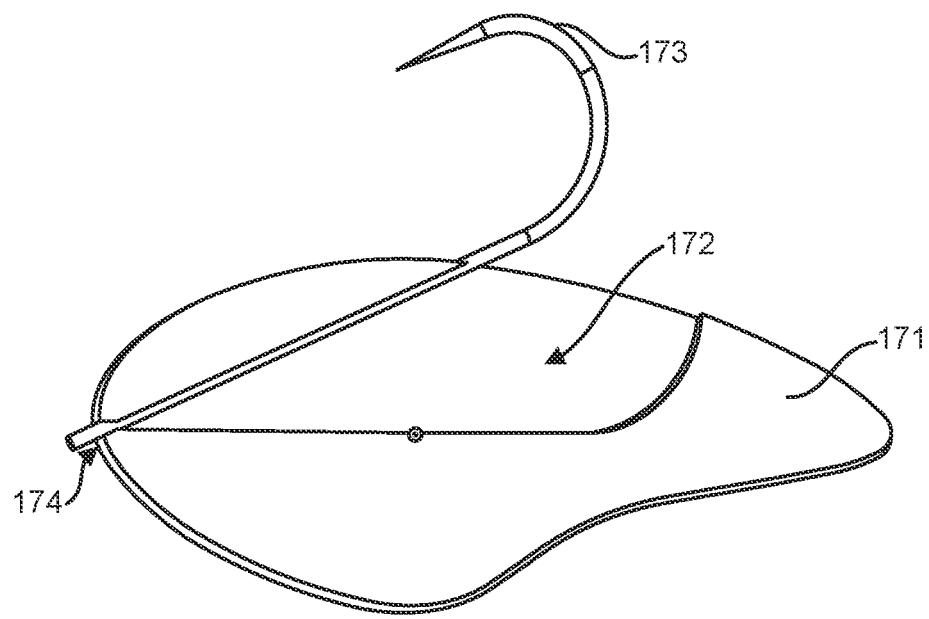
FIG. 17B is a cross-section of the lure body of FIG. 17A where the hook has pivoted to the most exposed position, as it would be after a fish has been ensnared.

According to another embodiment, the exit hook may be designed to always remain "somewhat" inside the lure, but to pivot in such a way that the entire bend of the hook is exposed. An example of this embodiment is shown in FIGS. 17A and 17B. In this embodiment, body 171 includes a larger channel 172 wherein hook 173 can pivot at axis 174 from the (partially) hidden position seen in FIG. 17A to the (partially) exposed position seen in FIG. 17B.

According to various embodiments, the channel may be tilted either "up" or "down" relative to the body, to accommodate different body styles. For example, as non-limiting examples, a longer, thinner body might have a slight) (5-15° tilt, while a shorter, thicker body, might have a steeper) (30-45° tilt. It will be appreciated, of course, that any degree of tilt may be used, depending on the requirements of the desired design and that the terms "slight" and "steeper" and the degrees of tilt are used as non-limiting examples.

Figure 18A:
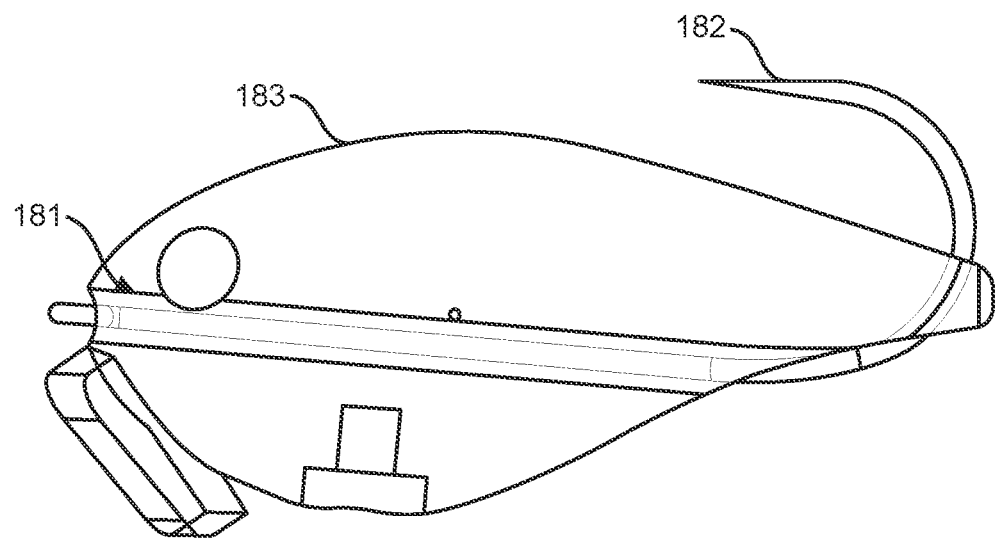
FIG. 18A is a cross-section of a lure body incorporating an exit hook design wherein the channel is angled downwards.
Figure 18B:
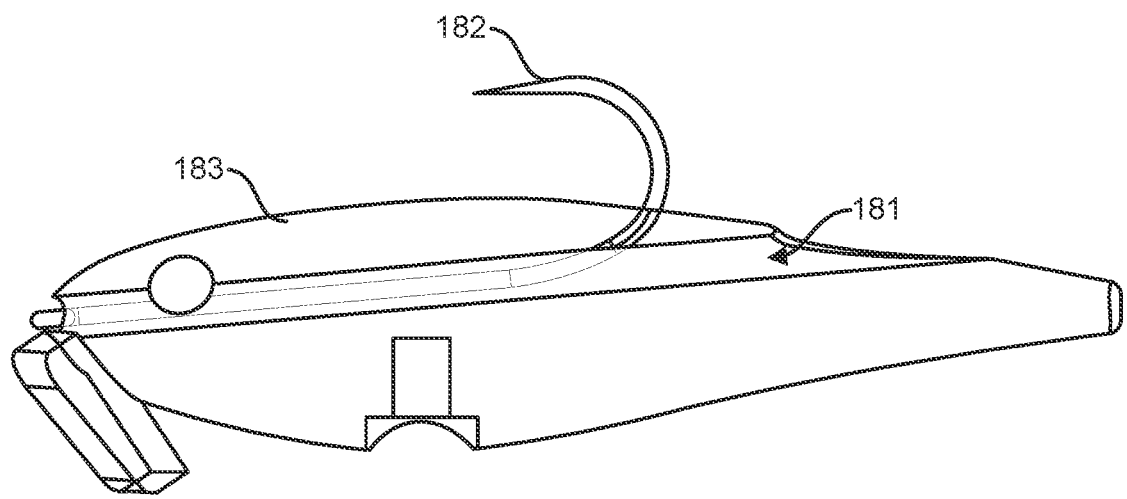
FIG. 18B is a cross-section of a lure body incorporating an exit hook design wherein the channel is angled upwards.
Figure 18C:
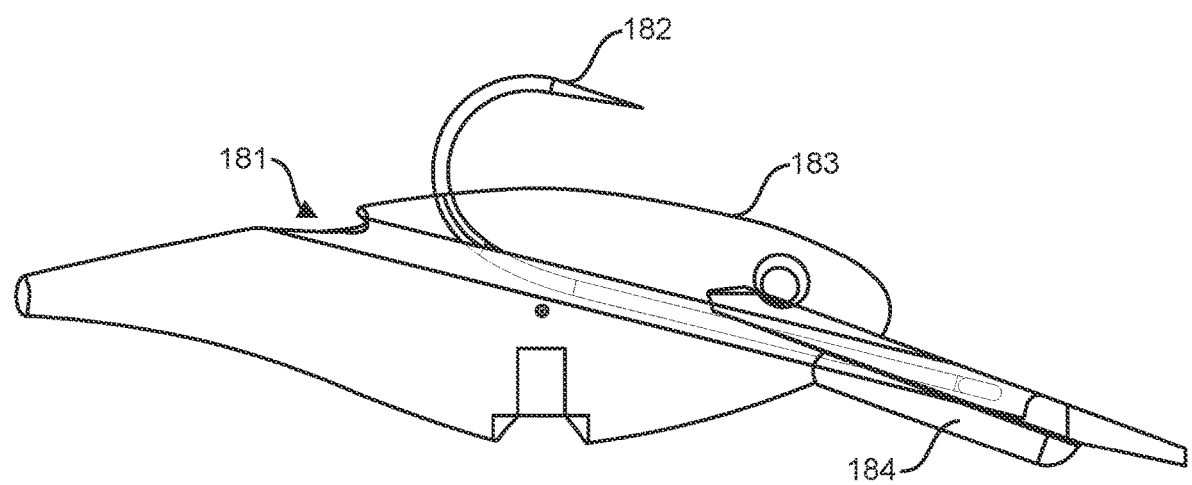
FIG. 18C is a cross-section of a lure body incorporating an exit hook design wherein the channel extends upwards through the body and extends into the lip.

FIGS. 18A-18C provide additional non-limiting examples of lures with the exit hook design. FIG. 18A shows an exemplary embodiment wherein the channel 181 has a slight) (5° downward tilt, which positions the point of hook 182 closer to the body 183. FIG. 18B shows a slight) (5° upward channel angle, which can result in the hook 182 exiting naturally even from a body 183 that is much longer than hook 182. FIG. 18C shows a channel 181 that is both slightly more angled (14°) and extends through body 183 into lip 184.

It should be noted that as shown in some of the figures, a small portion (i.e., the tip end) of the hook remains outside of the body while the hook is in the closed or hidden position (i.e., before a fish is ensnared). This allows the lure to begin to ensnare the fish when the fish initially bites or engages the lure. As described above, the act of the fish biting or engaging the lure then causes the hook to move towards the exposed position (which in some embodiments may involve the full exit of the hook from the body and in some embodiments may involve only a partial exit of the hook from the body), where it can fully engage (and thus "hook" or "catch") the fish.

Figure 19:
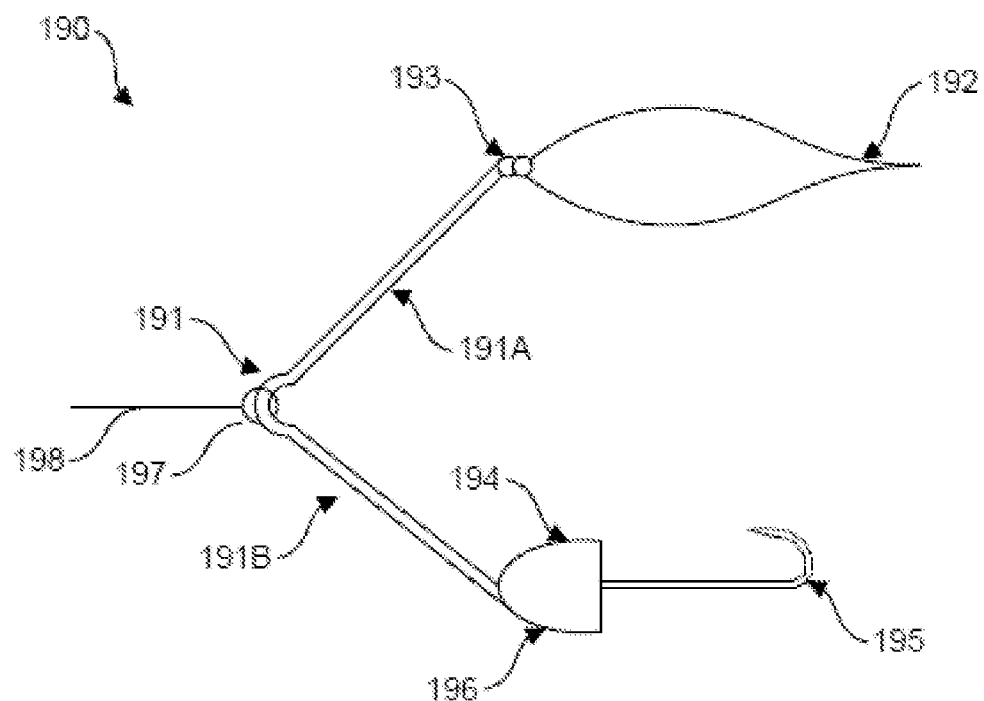
FIG. 19 is a schematic illustration of a fishing lure according to an embodiment of the present disclosure comprising a stiff wire connector having two ends wherein the first end is an oscillator end comprising an HBBO and the second end is a hook end having a weight and a hook.

FIG. 19 shows an exemplary embodiment of a lure according to the present disclosure incorporating some or all of the components described above. As shown, lure 190 includes a connector 191 which physically separates and maintains distance between various components of the lure. The connector 191 shown in FIG. 19 comprises a central axis 197 which connects to the fishing line 198 and from which two arms (191A. 191B) extend. This configuration may be referred to as an open "safety pin" configuration. Attached to the end of arm 191A (at the "oscillator end") is an oscillator 192 (which may or may not incorporate the HBBO described above), which may be attached to the wire via connector 193. Attached to arm 191B (at the "hook end") is a trailer 194 comprising a hook 195 (which may or may not incorporate the exit hook design described above).

In general, the connector may be formed from wire or a material with similar properties. The arms of the wire may be bent or positioned at any angle relative to each other and/or any length relative to each other so long as there is sufficient space between the elements connected to the first and second arms such that the elements do not entangle.

Figure 20:
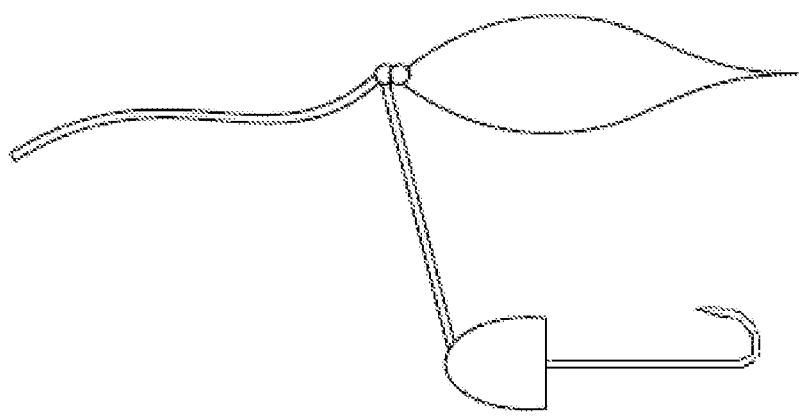
FIG. 20 is a schematic illustration of another embodiment of a fishing lure according to the present disclosure wherein a HBBO is connected directly to the line and a stiff wire which is then connected to a weight and hook.
Figure 21:
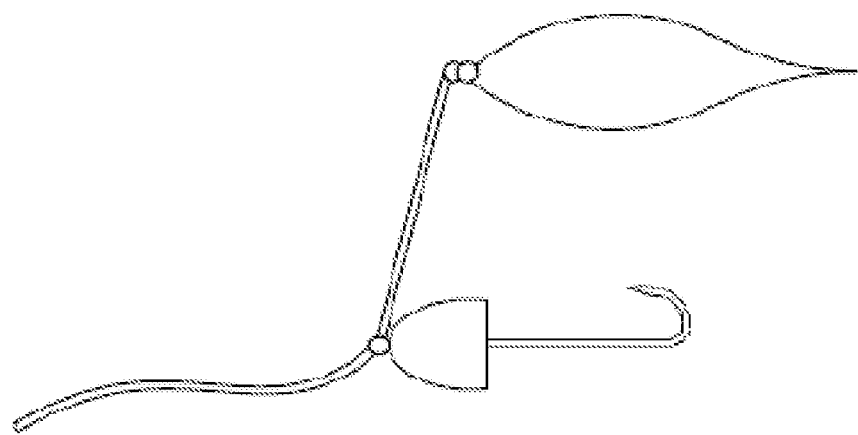
FIG. 21 is a schematic illustration of another embodiment of a fishing lure according to the present disclosure wherein a weight and hook is connected directly to the line and a stiff wire which is then connected to an HBBO.

According to some embodiments, the connector may be a single (unbent) wire wherein one end connects to the oscillator and one end connects to the trailer. In this embodiment, the fishing line may be connected to either end of the connector (i.e., at the oscillator or at the trailer) as shown in FIGS. 20 and 21.

Returning to FIG. 19, it should be understood that the term "stiff connector" is intended to mean that the connector has sufficient strength or "stiffness" to maintain sufficient distance between components attached to the oscillator end and components attached to the hook end do not enmesh or entangle while the lure is in use. Moreover, it will be understood that the exact size and stiffness required by such a connector will be determined by the size, shape, and movement of the various components attached thereto.

As shown in FIG. 19, the hook end may further incorporate weight 196. It should be noted that the terms "oscillator end" and "hook end" are used merely for clarity of explanation with regard to the depicted embodiment and that such terms are not intended to be limiting. For example, in some embodiments the "hook end" may also incorporate an oscillator and/or the "oscillator end" may include one or more hooks. To that end, the oscillator body itself might incorporate one or more hooks and such an embodiment would still be considered to be within the scope of the present disclosure.

Still referring to FIG. 19, it should be noted that the combination of a stiff connector 191 and the positioning of weight 196 on the "hook end" of the wire enables the lure to adopt a "vertical orientation" in the water wherein the oscillator end is positioned above the hook end. It will be noted of course, that various embodiments may incorporate other mechanisms for maintaining this orientation other than the use of weight 196, for example, the hook end of the lure may include a body or other element that produces negative lift, such as, for example, an HBBO with negative lift. Similarly, the oscillator end may incorporate an element (such as an HBBO with positive lift) that helps to maintain this vertical orientation.

According to various embodiments, trailer 192 may further comprise additional elements including but not limited to standard fishing lure trailer components such as those commonly referred to as skirts, "twisters," "swim baits," pork baits, and minnows (alive, dead, or synthetic), including multiples and/or combinations thereof. Moreover, such components may be made from or comprise soft and/or rigid materials.

Figure 22:
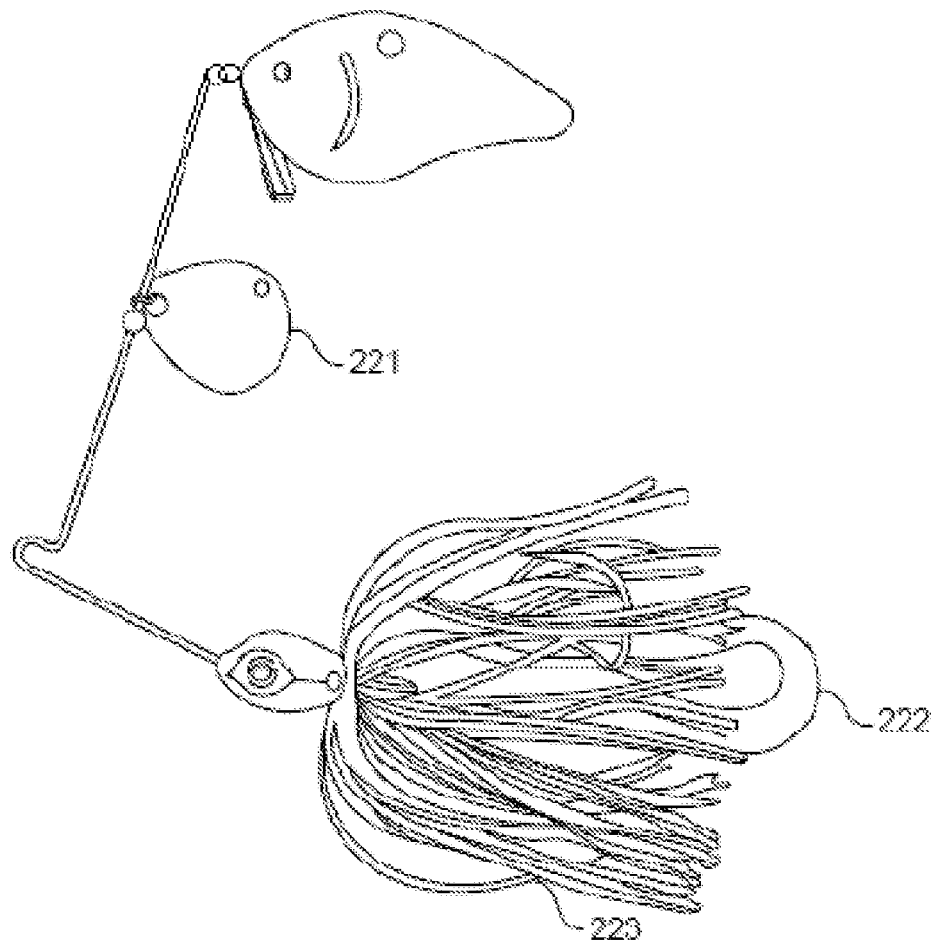
FIG. 22 is a schematic illustration of a fishing lure according to an embodiment of the present disclosure comprising additional elements including a spinner and a tail.

FIG. 22 shows a second embodiment with several optional elements including a spinner 221, a soft plastic tail 222, and a skirt 223.

Figure 23:
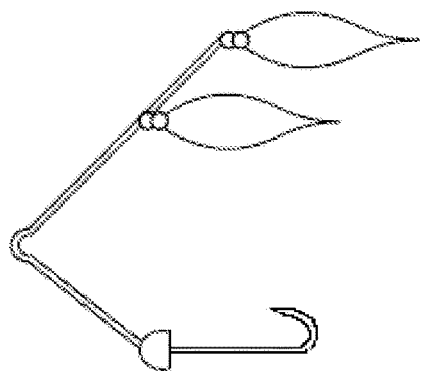
FIG. 23 is a schematic illustration of a fishing lure according to an embodiment of the present disclosure comprising multiple HBBOs connected in series to a single wire.
Figure 24:
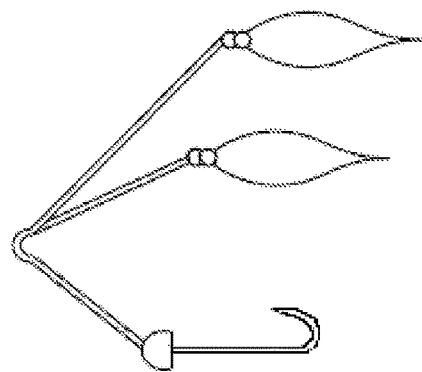
FIG. 24 is a schematic illustration of a fishing lure according to an embodiment of the present disclosure comprising multiple HBBOs connected in parallel to forked wires.
Figure 25:
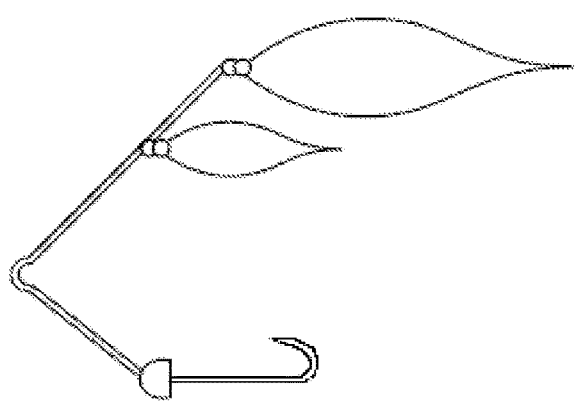
FIG. 25 is a schematic illustration of a fishing lure according to an embodiment of the present disclosure comprising a first smaller HBBO and a second larger HBBO connected in series.
Figure 26:
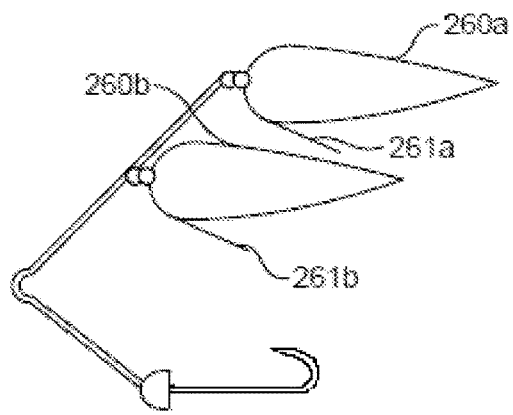
FIG. 26 is a schematic illustration of a fishing lure according to an embodiment of the present disclosure comprising multiple HBBOs with positive lift connected in series.
Figure 27:
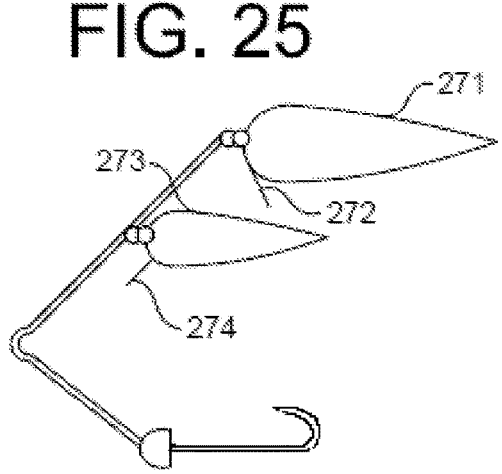
FIG. 27 is a schematic illustration of a fishing lure according to an embodiment of the present disclosure comprising a first smaller HBBO having negative lift and a second larger HBBO having positive lift connected in series.
Figure 28:
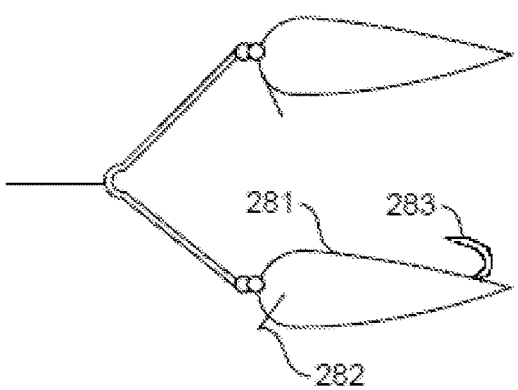
FIG. 28 is a schematic illustration of a fishing lure according to an embodiment of the present disclosure comprising a first HBBO with positive lift connected to a second HBBO with negative lift and a hook.

It should be understood that a lure according to the present disclosure may incorporate any combination of single or multiple instances of the various components described herein, with such instances being entirely multiplicative or varying from each other in terms of any number of aspects including, but not limited to, size, orientation, lift, body design, color, etc. For example, as shown in FIGS. 23-25 a lure according to the present disclosure may incorporate multiple HBBOs on the same or separate wires and of the same of different sizes. Moreover, one or more of the multiple HBBOs may incorporate the lift producing lip described above. Furthermore, as shown in FIGS. 26-28, multiple HBBOs may be used wherein each HBBO produces the same or a different degree or type of lift. For example, in FIG. 26, both HBBOs 260*a* and 260*b* include lips 261*a* and 262*b*, respectively that produce positive lift, while in FIG. 27, a larger HBBO 271 produces positive lift via lip 272 while a smaller HBBO 273 produces negative lift via lip 274. Even further, a lure may incorporate an HBBO connected at both the above-described "oscillator" and "hook" sides of connector. According to some embodiments, and as shown in FIG. 28, it may be desirable to incorporate an HBBO 281 with negative lift created by lip 282, at the hook end instead of or in addition to, a weight. Moreover, as shown in FIG. 28 HBBO 281 may itself include a hook 283, which may or may not include the Exit hook design described above.

The terms and expressions that have been employed are used as terms of description and not of limitation, and there is no intent in the use of such terms and expressions to exclude any equivalent of the features shown and described or portions thereof, but it is recognized that various modifications are possible within the scope of the invention as claimed. Thus, it will be understood that although the present invention has been specifically disclosed by preferred embodiments and optional features, modification and variation of the concepts herein disclosed may be resorted to by those skilled in the art, and that such modifications and variations are considered to be within the scope of this invention as defined by the appended claims.

What is claimed is:

1. A fishing lure comprising a hard body configured to movably receive a hook having a straight end and a curved end, the hard body having:
    a lip; and
    a channel extending through the body and into the lip wherein the channel is a narrow channel sized to receive the straight end of a hook and position the hook such that only a portion of the curved end of the hook is exposed until a fish is ensnared; and wherein a substantial portion of the hook is hidden within the channel until a fish is ensnared and wherein ensnaring a fish causes the hook to move such that the hook is exposed to a sufficient degree to catch on to the fish.

2. The fishing lure of claim 1 wherein the hook is attached to a pivot point so that when a fish is not ensnared, a substantial portion of the hook is hidden within the channel but when a fish is ensnared, the action of the fish causes the hook to pivot and become sufficiently exposed to more securely ensnare the fish.

3. The fishing lure of claim 1 wherein the channel has an upward tilt.

4. The fishing lure of claim 1 wherein the channel has a downward tilt.

5. The fishing lure of claim 1 wherein the hook is connected directly to the fishing line and wherein, when a fish is ensnared by the hook, fishing line is pulled through the channel.

6. The fishing lure of claim 5 wherein the hook completely exits the body when a fish is ensnared.

7. The fishing lure of claim 1 wherein the body comprises a crook slot that both enables at least a portion of the crook of the hook to be exposed while maintaining the orientation of the hook relative to the body.

8. The fishing lure of claim 1 wherein the body includes an externally accessible ballast chamber.

* * * * *